Patented Nov. 18, 1930

1,781,716

UNITED STATES PATENT OFFICE

DONALD B. BRADNER AND CHARLES H. MILLIGAN, OF HAMILTON, OHIO, ASSIGNORS TO THE CHAMPION COATED PAPER CO., OF HAMILTON, OHIO, A CORPORATION OF OHIO

PAPER-COATING COMPOSITION

No Drawing. Application filed December 31, 1927. Serial No. 244,038.

This invention relates to improved paper coating compositions, to methods of making same, and to paper coated therewith.

In the paper industry generally and in the present description the term "paper coating compositions" is used to designate the coating compositions applied to paper (raw stock), which compositions on the dry basis usually comprise 70% or more finely divided mineral pigment matter and not more than 30% adhesive. The pigment may be china clay, satin white, blanc fixe, or the like, and the adhesive is usually the carbohydrate starch or the proteins glue, casein and albumen, casein being most commonly used. Casein is used more extensively than all other adhesives in the manufacture of coated paper because of the general superiority of the appearance of the finished paper and the comparatively greater water-proofness of coatings containing casein. On the other hand, casein is a relatively expensive material.

All of these adhesives are likely to undergo spontaneous decomposition after being dissolved or dispersed in water either alone or in the presence of mineral pigments. This is particularly true of protein adhesives. This spoilage or putrefactive decomposition of protein adhesives produces a number of deleterious effects. Thus a very offensive odor is developed which not only pollutes the atmosphere in the mill where the coating is prepared, but the finished paper also smells foully. This fact prevents the use of papers coated with compositions containing protein adhesives as wrappings for food products and is an objection to their use in books, magazines, and other printed matter for which coated paper is extensively employed.

It frequently happens that decomposition proceeds to such an extent that entire batches of adhesive or coating mixtures amounting to hundreds of pounds must be dumped into the sewer.

Another change which accompanies the decomposition of adhesives is loss of adhesive strength. This results in a larger proportion of adhesive being required to produce a given degree of sizing to the coating. Inasmuch as the adhesive is the most expensive ingredient in the coating mixtures, it is obvious that any condition requiring larger quantities of adhesive is disadvantageous.

Another disadvantage accompanying the use of partially spoiled adhesive is the effect it has on certain dyestuffs used to tint the paper. For example, it has been observed that certain dyes are completely destroyed in less than one hour when left in contact with casein which is undergoing bacterial decomposition. Whether this is due to the dye being assimilated by the bacteria present in the casein or whether there is a chemical reaction between the dye and the casein decomposition products has not been determined. The practical result of this destructive action on the dyes is to create great difficulty in matching, reproducing, and maintaining shades in the coated paper. Since practically all coatings are tinted, the importance of using unspoiled adhesive is evident.

Due to the tendency of adhesive to spoil, a large number of relatively small batches of coating mixtures must be prepared in a coating mill and this makes it difficult to insure uniformity in the various batches, particularly since the various batches are likely to be in different stages of decomposition.

One object of this invention is to prevent spontaneous decomposition of protein-containing coating mixtures. Another object is to produce a coated paper which is consistently free from objectionable odors. Further objects of the invention are to: (1) produce coated paper whose shade does not unintentionally vary from lot to lot; (2) to produce coated paper more uniformly sized; (3) to effect economies in the quantities of adhesive used; (4) to simplify and standardize the manufacture of paper coating mixtures.

Further objects of the specific modification of the invention described below are to decrease the quantity of casein required in paper coating compositions without decreasing the adhesiveness of the coating, and to produce a coated paper having improved water-proof qualities.

Briefly, the objects of this invention are accomplished by the use of chlorinated proteins as adhesives in the coating compositions. Paper coating compositions made from chlorinated protein adhesives are much more resistant to putrefactive decay than coating mixtures containing the corresponding unchlorinated protein adhesive. For example, an alkaline mixture of 8 gr. casein, 58 gr. china clay, and 90 gr. water was compared with a similar mixture in which chlorinated casein was used in place of casein. Both coating mixtures were kept at room temperatures (approximately 70° F.). At the end of sixteen hours the casein mixture had decomposed sufficiently to have a very offensive odor, whereas it required four days for the chlorinated casein mixture to reach approximately the same degree of decomposition.

This invention may be carried out in several ways. Thus dry chlorinated protein adhesive may be dissolved or dispersed in water with the aid of alkalies, if necessary. Clay or other mineral pigment is then added and the slurry is well mixed. The resulting suspension after tinting is then applied to the paper according to the methods common to the industry. In another method of carrying out the invention the unchlorinated protein may be dissolved or dispersed in water with the aid of alkalies, if necessary, and chlorine or alkali metal hypochlorite solution added to the protein solution. In this manner of carrying out the invention the chlorinated protein is prepared in solution, and to this solution is then added directly the clay or other mineral pigment and well mixed. After this the mixture is tinted and applied to the paper. Or, a suspension of pigment and unchlorinated protein dispersed in water is prepared and chlorine or alkali metal hypochlorite solution added and mixing is continued. After thorough mixing a tint is added and the coating mixture is applied to the paper.

If the coating mixture is prepared from dry chlorinated protein adhesive, the chlorinated protein adhesive may be prepared according to any of the methods described in the literature. Chlorinated proteins are substances of variable chemical composition in which more or less chlorine has been introduced into the molecule. Only a relatively small amount of chlorine introduced into the molecule is required to secure the improved preservative qualities of the adhesive. For example, a chlorinated protein adhesive containing only 1 or 2% of chlorine is decidedly more resistant to bacterial decomposition than the corresponding unchlorinated adhesive.

It should be noted that under certain conditions, particularly when the pH of the composition is greater than 9, the chlorinated casein or other chlorinated protein adhesive may not actually contain chlorine in the molecule but the preservative action of these compounds is nevertheless retained.

Although it is possible to add free chlorine to a paper coating composition containing a protein adhesive, and thereby form a chlorinated protein, the accurate control of the quantity of chlorine added is difficult, and the physicochemical conditions of the coating composition must be carefully regulated for success. For instance, there is danger of the mixture becoming acid at the point where the chlorine is being added, in which case the coating mixture is likely to coagulate. Paper coating compositions are colloids and slight changes in acidity or alkalinity or temperature are likely to produce great changes in viscosity and thus may make it unsuitable for coating paper.

If a hypochlorite solution is used in carrying out this invention it is essential that the hypochlorite chosen must not react with the protein to form a precipitate. For example, the most common hypochlorite, calcium hypochlorite, ordinary bleach, thickens a coating mixture containing casein to such an extent that it is not practical to use it. We have found that alkali metal hypochlorites such as sodium or potassium hypochlorite, on the other hand, can be used to great advantage in all the common paper coating compositions, preserving the composition without in any way interfering with its normal functioning. In general, agents containing active chlorine and free from metals which precipitate the protein adhesive may be used for the purpose of this invention.

The following example will illustrate one method of carrying out this invention: Dissolve 90 lbs. casein in water to which 7.3 lbs. soda ash has been added, making a total volume of 60 gallons. Add 700 lbs. of clay slurry containing 58% dry clay and 42% water and 300 lbs. of satin white (20% solids). Then add 1.5 gallons of a solution of sodium hypochlorite containing 100 grams available chlorine per liter and 20 grams free sodium hydroxide per liter and thoroughly mix. The resulting mixture gives a coating which when tinted with a dye is highly satisfactory for coating paper and which may be kept for at least three days without decomposition. The coating mixture is applied to the paper by an ordinary coating machine.

We have further discovered that at certain hydrogen ion concentrations a coating mixture containing chlorinated casein has a greater sizing or adhesive power than an otherwise identical mixture containing unchlorinated casein.

The casein solutions commonly used in preparing coating compositions for coated paper are prepared by dissolving casein in an alkaline solution. The alkalies used for this purpose may be caustic soda, sodium carbonate, borax, sodium phosphate, and the like. The proportion of alkali to casein varies considerably among the various manufacturers, but of course there must always be at least enough to dissolve the casein. In carrying out this form of our invention the common alkaline sodium or potassium compounds may be used to dissolve the casein. However, the excess alkali not combined with the casein must be regulated so that the pH of the casein solution does not exceed 9 after being mixed with the mineral pigment. In preparing the casein or chlorinated casein solutions we prefer to use a quantity of the soda ash equal to 6–10% of the weight of the adhesive.

One way of carrying out this invention is to dissolve dry chlorinated casein in alkali, the clay or other mineral pigment is added, and the resulting mixture well agitated and tinted. The pH of the mixture should not exceed 9 during the preparation. This mixture is satisfactory for coating paper and requires less adhesive than casein alone. The chlorinated casein may be prepared according to any of the methods described in the literature.

In another way of carrying out this invention we dissolve casein in water with the aid of alkaline sodium or potassium compounds and then add mineral pigment. Either before or during the mixing of casein with the mineral pigment we add either chlorine or alkali metal hypochlorite solution, maintaining the pH of the slurry at a value below 9. The coating mixture is then applied to paper in the usual manner.

The following example will serve to illustrate one way of carrying out this form of our invention: 100 lbs. of casein are mixed with warm water and 7 lbs. of soda ash are added to make a total volume of 66 gallons. The casein solution during this preparation is agitated and cooked for one-half hour at a temperature not exceeding 130° F. To this casein solution are added 1,500 lbs. of a clay slurry consisting of 58% clay and 42% water. To this mixture is added 6 liters of a solution of sodium hypochlorite containing approximately 100 grams of available chlorine per liter, and also containing 20 grams of free sodium hydroxide per liter. The whole mixture is stirred until thorough incorporation is secured after which a suitable dye is added. The mixture so prepared is then applied to paper according to any of the methods used in the industry.

Coated paper prepared according to the above-described modification of the invention requires 10–20% less adhesive than coated paper prepared from compositions containing unchlorinated casein. In addition it has a high degree of water-proofness and is highly satisfactory for lithographic press work and other uses for which coated paper is commonly used.

In case a solution of sodium or potassium hypochlorite is used for making the chlorinated protein adhesive it is advisable to use a solution containing a little free alkali. Sodium or potassium hypochlorite solutions containing no free alkali are unstable and should be kept as a relatively dilute cold solution. However, in the presence of a small amount of free alkali, for example, 2% caustic soda, strong solutions (10–17%) may be employed at room temperatures without serious decomposition. Only a relatively small quantity of chlorine or alkaline hypochlorite is required. We prefer to use a quantity of sodium hypochlorite containing available chlorine to the extent of approximately 1.5% of the weight of dry adhesive used. Inasmuch as it is generally desirable in the manufacture of coating mixtures not to add any more water than is needed, especially when it is desired to lay a heavy coating on the paper, the alkali hypochlorite solution should be fairly concentrated, say 10–15%, so that only a small volume will be required. This will not appreciably change the solid content or viscosity of the coating mixture.

The coating mixtures herein described may be applied to paper by means of the usual paper coating machines. The coating may be applied on either side of the paper, or both sides, consecutively or simultaneously. The method is applicable to heavy or light coatings. The coated paper is free from objectionable odor and has a greater uniformity of size and shade than is ordinarily obtained.

The term "chlorinated protein adhesive" or "chlorinated casein" is used in the present specification and claims to denote protein adhesives or casein, respectively, which have been subjected to the action of agents containing active chlorine, either before its incorporation in the coating compositions or at some stage in the process of making the compositions.

We claim:

1. Process of making paper coating compositions which comprises admixing chlorinated protein adhesive and mineral pigment.

2. Process of making paper coating compositions which comprises admixing chlorinated casein and mineral pigment.

3. Process of making paper coating compositions which comprises admixing protein adhesive in aqueous solution, an agent containing active chlorine and free from metals which precipitate the adhesive, and mineral pigment.

4. Process of making paper coating compositions which comprises admixing casein in aqueous solution, an agent containing active chlorine and free from metals which precipitate casein, and mineral pigment.

5. Process of making paper coating compositions which comprises admixing an alkali metal hypochlorite, a protein adhesive and mineral pigment.

6. Process of making paper coating compositions which comprises admixing casein, an alkali metal hypochlorite and mineral pigment.

7. A process of making paper coating compositions which comprises admixing casein, pigment and an agent containing active chlorine but free from metals which precipitate casein, at a pH value not exceeding 9.

8. A process of making paper coating compositions which comprises admixing casein, pigment and an alkali metal hypochlorite, at a pH value not exceeding 9.

9. Paper coating composition containing a protein adhesive which has been subjected to the action of an agent containing active chlorine and free from metals which precipitate the adhesive.

10. Paper coating composition containing casein which has been subjected to the action of an agent containing active chlorine and free from metals which precipitate casein.

11. Paper coating composition containing a protein adhesive which has been subjected to the action of an alkali metal hypochlorite.

12. Paper coating composition containing casein which has been subjected to the action of an alkali metal hypochlorite.

13. A paper coating composition having a pH value not exceeding 9 and containing chlorinated casein.

14. A paper coating composition containing casein which has been subjected to the action of an agent containing active chlorine but free from metals which precipitate casein, at a pH value not exceeding 9.

15. A paper coating composition containing casein which has been subjected to the action of an alkali metal hypochlorite, at a pH value not exceeding 9.

16. Paper coated with a composition of claim 9.

17. Paper coated with a composition of claim 10.

18. Paper coated with a composition of claim 11.

19. Paper coated with a composition of claim 12.

20. Paper coated with a composition of claim 13.

21. Paper coated with a composition of claim 14.

22. Paper coated with a composition of claim 15.

In testimony whereof, we affix our signatures.

DONALD B. BRADNER.
CHARLES H. MILLIGAN.